3,299,096
DIPHENETHYLBENZENE TETRACARBOXYLIC ACID DIIMIDES

Ferdinand B. Zienty, Warson Woods, and Myron J. Holm, Olivette, Mo., assignors to Monsanto Company, St. Louis, Mo., a corporation of Delaware
No Drawing. Original application June 5, 1964, Ser. No. 373,065. Divided and this application Mar. 24, 1966, Ser. No. 536,968
3 Claims. (Cl. 260—326.3)

The present application is a division of our copending application, Serial Number 373,065, filed June 5, 1964. This invention relates to new chemical compounds and particularly to derivatives of diphenethylbenzene tetracarboxylic acid diimides. These compounds which exhibit utility as synthetic resin intermediates are characterized by the following structural formula:

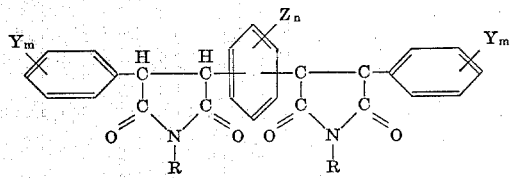

with R being selected from the group consisting of hydrogen, alkyl, alkenyl, cycloalkyl, monocarboxylic aryl and monocarbocyclic aralkyl radicals containing from 1 to 18 carbon atoms, Y is a monovalent substituent selected from the group consisting of alkyl monocarbocyclic aryl and phenoxy, toloxy, alkoxy radicals containing from 1 to 18 carbon atoms, nitro radicals, halogens and secondary and tertiary amino radicals, Z is a monovalent substituent selected from the group consisting of methyl radicals and halogens, $m$ is a cardinal number from 0 to 5 inclusive, and
$n$ is a cardinal number from 0 to 4 inclusive.

Tetracyanodiphenethylbenzene, the parent compound of the present group, can be prepared by the condensation of a benzenediacetonitrile with a benzaldehyde to form dibenzylidene-benzenediacetonitrile followed by cyanation of the dibenzylidene-benzenediacetonitrile. The condensation and cyanation can be conducted in a one-step operation, or the introduction of the additional nitrile groups can be deferred until the condensation is complete. The tetracyanodiphenethylbenzene thus obtained can be partially hydrolized to the corresponding diimide. Another method of preparing the diimides is to fully hydrolize the tetracyanodiphenethylbenzene to its tetra acid form, form its anhydride and thereafter ammoniate the anhydride to the corresponding diimide.

As indicated above, benzaldehyde can be used in the preparation of the present invention. However, in the preparation of compounds having substituents on the terminal benzene rings, it is preferred to use substituted benzaldehydes rather than to add the substituents after the condensation reaction. Specific examples of substituted benzaldehydes that can be employed include methylbenzaldehydes, ethylbenzaldehydes, propylbenzaldehydes, butylbenzaldehydes, decylbenzaldehydes, dodecylbenzaldehydes, octylbenzaldehydes, methoxybenzaldehydes, ethoxybenzaldehydes, propoxybenzaldehydes, butoxybenzaldehydes, nonaxybenzaldehydes, undecoxybenzaldehydes, octabdecoxybenzaldehydes, phenylbenzaldehydes, tolylbenzaldehydes, phenoxylbenzaldehydes, toloxybenzaldehydes, nitrobenzaldehydes, chlorobenzaldehydes, fluorobenzaldehydes, bromobenzaldehydes, iodobenzaldehydes, nitrohalobenzaldehydes, alkylhalobenzaldehydes, alkoxyhalobenzaldehydes, aroxyhalobenzaldehydes, alkylnitrobenzaldehydes, alkylnitrohalobenzaldehydes and the like. The substituents on the benzaldehyde nucleus can vary in number from one through five, be like or unlike, and members of the groups indicated hereinbefore.

The benzenediacetonitrile to be condensed with the benzaldehyde may be ortho, meta or para, substituted or unsubstituted. Suitable benzenediacetonitrile include mono-, di-, tri- and tetra-methylbenzenediacetonitriles, mono-, di-, tri- and tetra-chlorobenzenediacetonitriles, mono-, di-, tri- and tetra-fluorobenzenediacetonitriles, mono-, di-, tri- and tetra-bromobenzenediacetonitriles, and mono-, di-, tri- and tetra-iodobenzenediacetonitriles. Mixed halobenzenediacetonitriles and methylhalobenzenediacetonitriles may also be employed. Examples of suitable benzenediacetonitriles of these groups include chlorofluoro-, chlorobromo-, chloroiodo-, fluorobromo-, fluoroiodo-, bromochloro-, bromoiodo-, chlorobromoiodo-, methylchloro-, methylfluoro-, methyliodo-, methylbromobenzenediacetonitriles and the like.

As indicated above, R in the foregoing formula can be hydrogen or a hydrocarbon group containing one to eighteen carbon atoms. Representative alkyl groups include methyl, ethyl, propyl, butyl, pentyl, hexyl, heptyl, octyl, nonyl, decyl, hendecyl, dodecyl, tridecyl, tetradecyl, pentadecyl, hexadecyl, heptadecyl, octadecyl and the like. Suitable alkenyl groups include for example, vinyl, alkyl, propenyl, butenyl, pentenyl, hexenyl, heptenyl, octenyl, nonenyl, decenyl, hendencyl, dodecenyl, tridecenyl, tetradecenyl, pentadecenyl, hexadecenyl, heptadecenyl, octadecenyl and the like. Alkenyl groups containing more than one double bond are also suitable. Cycloalkyl groups represented by R include cyclopropyl, cyclobutyl, cyclopentyl, cyclohexyl, cycloheptyl, cyclooctyl and the like. The cycloalkyl groups can have one or more hydrocarbon side chains to provide substituted cycloalkyl groups containing as many as eighteen carbon atoms. Aryl groups represented by R include phenyl, tolyl, xylyl, ethylphenyl, propylphenyl, butylphenyl, pentylphenyl, hexylphenyl, heptylphenyl, octylphenyl, nonylphenyl, decylphenyl, hendecylphenyl, dodecylphenyl and the like. Thus, the aryl groups can have one or more alkyl substituents containing a maximum of twelve carbon atoms. Representative monocyclic aralkyl or alphyl groups designated by R include benzyl, phenylethyl, phenylpropyl, phenylbutyl, phenylpentyl, phenylhexyl, phenylheptyl, phenyloctyl, phenylnonyl, phenyldecyl, phenylhendecyl, phenyldodecyl, xylylethyl and the like. While it is preferred that all of the above hydrocarbon groups are unsubstituted, they can have nitro groups or halogens. Also, the hydrocarbon chains can be either straight or branched.

The invention will be further clarified by reference to the following detailed descriptions of the preparation of compounds encompassed thereby. Unless otherwise specified, all proportions in these examples and throughout the specification are expressed in parts by weight.

EXAMPLE 1

*p-Dipthenethylbenzene-α,α′,β,β′-tetracarboxylic acid diimide*

A mixture of about 40 grams of α,α′,β,β′-tetracyano-p-diphenethylbenzene prepared as set forth in applicants' copending application, Serial Number 373,065, filed June 5, 1964, and about 100 grams of p-toluenesulfonic acid monohydrate is prepared in a 500 ml. flask provided with an agitator. With continuous agitation the mixture is heated to and maintained at a temperature of about 120° C. for approximately one hour. After cooling the diimide thus prepared is seprated from the unreacted p-toluenesulfonic acid monohydrate by leaching with water, then collected by filtration and purified by recrystallization from ethanol. The product is a high melting white crystalline material having an infrared spectrum consistent with the assigned structure.

EXAMPLE 2

*N,N'-dimethyl-p-diphenethylbenzene-α,α',β,β'-tetracarboxylic acid diimide*

About 10 grams of the dianhydride prepared in accordance with Example 32 of applicants' copending application Serial Number 373,065, filed June 5, 1964, is dissolved in about 200 ml. of acetonitrile in a suitable reaction vessel equipped with a stirrer. Then two equivalents of methylamine are added. The volatile materials are removed by distillation under reduced pressure leaving the diacid-diamide which is converted to the diimide by refluxing with about 100 ml. of acetic anhydride. Removal of the acetic anhydride by distillation leaves the diimide.

EXAMPLE 3

*N,N'-di-n-butyl-p-diphenethylbenzene-α,α'β,β'-tetracarboxylic acid diimide*

This product is made by the method of Example 2 using n-butylamine in place of methylamine.

EXAMPLE 4

*N,N'-di-n-dodecyl-p-diphenethylbenzene-α,α'β,β'-tetracarboxylic acid diimide*

This product is made by the procedure of Example 2 using n-dodecylamine in place of methylamine.

EXAMPLE 5

*N,N'-dicyclohexyl-p-diphenethylbenzene-α,α'β,β'-tetracarboxylic acid diimide*

This product is made in accordance with the procedure of Example 2 using cyclohexylamine in place of the methylamine.

EXAMPLE 6

*N,N'-dibenzyl-p-diphenethylbenzene-α,α'β,β'-tetracarboxylic acid diimide*

This product is made in accordance with the procedure of Example 2 using benzylamine in place of methylamine.

EXAMPLE 7

*N,N'-di(p-tolyl)-p-diphenethylbenzene-α,α'β,β'-tetracarboxylic acid diimide*

This product is made in accordance with the procedure of Example 2 using p-toluidine in place of methylamine.

The compounds produced in accordance with the present invention are crystalline compounds of moderate molecular weight. They are insoluble in water, but readily soluble in a variety of commercially available solvents. They are of particular value as resin intermediates, and also as (intermediates in the preparation of) plasticizers, flame proofing agents, gear oil additives, high temperature grease additives, fungicides and in numerous other industrial applications. In addition a number of the compounds under consideration exhibit bacteriostatic properties. These products are also valuable since they present a series of compounds in which the melting point can be varied while the chemical characteristics are maintained substantially constant. High melting products are obtained by using the para form of benzene diacetonitrile as the starting material, whereas the ortho and meta benzene diacetonitriles yield lower melting products.

The diimides of the present invention are valuable plasticizers for polyvinyl chloride resins and nitrogeneous resins such as polyacrylonitriles and polyamides, and their good dielectric characteristics render them useful per se as insulators in electrical devices.

Numerous modifications and additional compounds will readily suggest themselves to those skilled in the art. Thus, while the invention has been described with particular reference to specific embodiments, it is to be understood that it is not to be limited thereto but is to be construed broadly and restricted solely by the scope of the appended claims.

The embodiments of the invention in which an exclusive property or privilege is claimed are defined as follows:

1. A diphenethylbenzene-α,α',β,β'-tetracarboxylic acid diimide of the formula

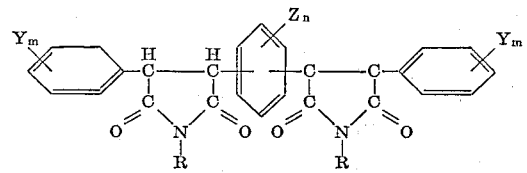

wherein R is selected from the group consisting of hydrogen, alkyl, alkenyl, cycloalkyl, monocarbocyclic aryl and monocarbocyclic aralkyl having up to 18 carbon atoms, Y is a monovalent substituent selected from the group consisting of alkyl, monocarbocyclic aryl, phenoxy, tolyloxy, alkoxy having up to 18 carbon atoms, nitro and halogen, Z is a monovalent substituent selected from the group consisting of methyl, nitro and halogen, $m$ is a cardinal number from 0 to 5 inclusive, and $n$ is a cardinal number from 0 to 4 inclusive.

2. A compound according to claim 1 which is p-diphenethylbenzene-α,α',β,β'-tetracarboxylic acid diimide.

3. A compound according to claim 1 which is N,N'-dimethyl-p-diphenethylbenzene-α,α',β,β'-tetracarboxylic acid diimide.

No references cited.

ALEX MAZEL, *Primary Examiner.*

J. TOVAR, *Assistant Examiner.*